US009867159B2

(12) United States Patent
Heldmaier et al.

(10) Patent No.: US 9,867,159 B2
(45) Date of Patent: Jan. 9, 2018

(54) NETWORK ARRANGEMENT AND METHOD FOR THE RADIO LOCATION OF OBJECTS WITHIN A CONFINED SPACE

(71) Applicant: Balluff GmbH, Neuhausen a.d.F. (DE)

(72) Inventors: Matthias Heldmaier, Stuttgart (DE); Andreas Schuerzinger, Schwaebisch Gmuend (DE); Daniel Schweizer, Filderstadt (DE)

(73) Assignee: Balluff GmbH, Neuhausen a.d.F. (DE)

( * ) Notice: Subject to any disclaimer, the term of this patent is extended or adjusted under 35 U.S.C. 154(b) by 0 days.

(21) Appl. No.: 15/403,264

(22) Filed: Jan. 11, 2017

(65) Prior Publication Data

US 2017/0245236 A1 Aug. 24, 2017

(30) Foreign Application Priority Data

Feb. 22, 2016 (DE) .................... 10 2016 103 077
Aug. 10, 2016 (DE) .................... 10 2016 114 797

(51) Int. Cl.
*H04W 24/00* (2009.01)
*H04W 64/00* (2009.01)
*H04W 60/02* (2009.01)
*H04H 20/16* (2008.01)
*H04B 7/26* (2006.01)

(52) U.S. Cl.
CPC ............ *H04W 64/00* (2013.01); *H04H 20/16* (2013.01); *H04W 60/02* (2013.01); *H04B 7/2618* (2013.01)

(58) Field of Classification Search
CPC ...... H04W 64/00; H04W 60/02; H04H 20/16; H04B 7/2618
See application file for complete search history.

(56) References Cited

U.S. PATENT DOCUMENTS

| | | | | |
|---|---|---|---|---|
| 5,216,429 A | * | 6/1993 | Nakagawa | ................ G01S 5/06 342/45 |
| 6,133,876 A | | 10/2000 | Fullerton et al. | |
| 7,873,099 B2 | | 1/2011 | Fullerton et al. | |
| 2008/0032706 A1 | * | 2/2008 | Sheynblat | ............. G01S 5/0036 455/456.1 |
| 2009/0233622 A1 | * | 9/2009 | Johnson | ................ H04W 64/00 455/456.3 |
| 2010/0271263 A1 | * | 10/2010 | Moshfeghi | ............ G01S 5/0263 342/378 |
| 2013/0117775 A1 | * | 5/2013 | Perry, II | ............. H04L 65/4076 725/14 |
| 2013/0244689 A1 | * | 9/2013 | Keerthi | ................. G01S 5/0215 455/456.1 |
| 2015/0156746 A1 | * | 6/2015 | Horne | ................... G01S 5/0205 455/456.6 |
| 2016/0366554 A1 | * | 12/2016 | Markhovsky | ............. G01S 3/46 |

* cited by examiner

*Primary Examiner* — Ajit Patel
(74) *Attorney, Agent, or Firm* — Collard & Roe, P.C.

(57) ABSTRACT

In a network arrangement for carrying out a location of locating objects that are arranged in a confined space and are able to be moved, the location being carried out by pulsed radio signals, wherein at least three communication-technically autarkic reference nodes that are spatially distributed and form a communication network are arranged in the confined space a communication protocol enables a location object that is arranged in the confined space to be localized by a trilateration carried out by a distance-based trilateration that is carried out by the at least three reference nodes.

19 Claims, 10 Drawing Sheets

Participant number <=5

500

| Chain Occupation Bit = LID | 1 | 2 | 3 | 4 | 5 | 6 | 7 | 8 | 9 | 10 | 11 | 12 | 13 | 14 | 15 | 16 | 17 | 18 | 19 | ... |
|---|---|---|---|---|---|---|---|---|---|---|---|---|---|---|---|---|---|---|---|---|
| Value | 0 | 0 | 0 | 1 | 0 | 0 | 1 | 0 | 0 | 0 | 0 | 0 | 0 | 1 | 1 | 0 | 1 | 0 | 0 | ... |
| Number | | | | 1 | | | 2 | | | | | | | 3 | 4 | 0 | 5 | 0 | 0 | ... |

515

520

525

| Channel / Measurement | M1 | M2 | M3 | M4 | M5 |
|---|---|---|---|---|---|
| 1→C1 | 4 | 7 | 14 | 15 | 17 |
| 2→C2 | 17 | 4 | 7 | 14 | 15 |
| 3→C1 | 15 | 17 | 4 | 7 | 14 |
| 4→C2 | 14 | 15 | 17 | 4 | 7 |
| 5→C1 | 7 | 14 | 15 | 17 | 4 |
| 6→C2 | 4 | 7 | 14 | 15 | 17 |
| ... | ... | ... | ... | ... | ... |

530

535

| Channel / Measurement | M1 | M2 | M3 | M4 | M5 |
|---|---|---|---|---|---|
| C1 reference | 11 | 12 | 13 | 14 | 15 |
| C2 reference | 21 | 22 | 23 | 24 | 25 |

NETWORK ARRANGEMENT AND METHOD FOR THE RADIO LOCATION OF OBJECTS WITHIN A CONFINED SPACE

CROSS REFERENCE TO RELATED APPLICATIONS

Applicant claims priority under 35 U.S.C. §119 of German Application No. 10 2016 103 077.5 filed Feb. 22, 2016 and 10 2016 114 797.4 filed Aug. 10, 2016, the disclosures of which are incorporated by references.

BACKGROUND OF THE INVENTION

1. Field of the Invention

The invention relates to a network arrangement for wirelessly locating or determining the position of objects within a confined space and a method for operating it, according to the preamble of the respective independent claims. The subject matter of the present invention is also a computer program and a machine-readable data storage device for storing the computer program, by means of which the method according to the invention is able to be carried out.

2. Description of the Related Art

In the field of industrial factory halls, production halls, factory premises or similar, it is known to spatially locate moving objects by means of wireless or radio localization. Such objects are automatic pallet trucks or devices ("Automated Guided Vehicles—AGV"), which are used in automated guided vehicle systems. These trucks are guided automatically and move along a real or virtual line marking without human operation. In the fields of warehousing or industrial production, it can involve locating steel products such as slabs or coils that haven been deposited in a steelwork, for example, wherein the objects, however, can also be autarkic robot vehicles, forklift trucks or similar. Thus, a one-dimensional location can take place along a lane guidance, for example, of a crane, a two-dimensional location on a flat surface or a spatial location of objects, for example in a three-dimensional storage system.

Such a radio locating system is known from U.S. Pat. No. 6,133,876 which is comprehensively referenced by means of the "Incorporation by Reference", and relates to a method and a network arrangement for determining position by means of pulse-shaped radio signals (so-called "impulse radio system"). Thus, a first transceiver having a first cycle and a second transceiver, which is distanced from the first transceiver and has a second cycle, are provided. Using the first cycle, a first reference cycle impulse is produced and a first series of impulses is broadcast by the first transceiver by this reference cycle impulse. This first series of impulses is received by the second transceiver and the second transceiver is synchronized by means of these impulses. Using the second cycle, a second reference cycle impulse is produced by the second transceiver and with this a second series of impulses is broadcast by the second transceiver. The first transceiver receives this second series of impulses and carries out a synchronization with it. On the basis of this synchronization, a first reference cycle impulse that is correspondingly delayed in time is produced and out of this, the time difference between the first reference impulse and the delayed first reference impulse is determined, wherein this time difference indicates the total running time of the first and the Second series of impulses.

A locating system based on ultra-wideband (UWB) signals and correspondingly on running time or flight time measurements emerges from U.S. Pat. No. 7,873,099, in which a UWB receiver of a corresponding data communication net synchronizes receiver-side time information, based on a received signal structure, wherein the time information is demodulated and wherein the demodulated time information is used to set a receiver-side cycle. The receiver-side cycle is adjusted by means of information about the running time delay, and namely by increasing the cycle value in order to compensate said running time delay. The running time delay is determined on the basis of a previously known distance between the sender and the receiver, wherein the sender and the receiver can be part of a two-way connection and wherein the running time delay is determined by measuring a package circulation period (so-called "round trip timing"), i.e. by measuring the time that a data package in the data communication net requires to broadcast from the sender to the receiver and back.

SUMMARY OF THE INVENTION

The idea underlying the invention is to undertake a location or spatial localization of (location) objects that are related here and preferably are able to be moved within a spatially confined space or area by a wireless or radio-based, distance-based measuring system, which preferably takes place based on said running time or flight time measurements. Each of these objects has a "label" that will be subsequently described in more detail, by means of which the object is able to be clearly identified or clearly distinguished from other objects. An object that is actively taking part in the measuring method is subsequently also labelled as a "participant". An object can thus be arranged on a pallet truck mentioned at the beginning or on every other asset, the location of which in such a space is to be determined.

The network arrangement according to the invention is based on a network topology in which a number of autarkic reference nodes are arranged to be distributed in the confined space or area. The corresponding network is preferably controlled by means of an administration node. It should however be noted that the functionality of the administration node can also be implemented in a reference node. Thus, the individual position of reference nodes and the position of the objects actively involved in the (measuring) process are able to be calculated from the flight time measuring data.

Splitting the whole network into at least two segments ("subnets") ensures that even large-spread or large-scale factory halls or factory premises are covered by only one position determination or surveillance system.

In the present perspective, said reference node logically also corresponds to said participant in such a network or segment, in which a localization of said location objects is to be undertaken, wherein the reference node is arranged or installed on a fixed point in the network infrastructure and wherein the coordinates of said reference node are recognized in an assignable coordinate system. Correspondingly, an administration node depicts a particular participant of the network or of the segment, said participant being arranged or installed on a fixed point of such a network infrastructure and carries out the management functions required for the method according to the invention. The administration node can additionally be equipped with a connection to a server computer in a corresponding IT infrastructure, which certainly does not necessarily have to be filled, since the administration node itself can also provide these functions.

In a network arrangement according to the invention or the method according to the invention, determining the position takes place by "trilateration", and namely by means of pulsed radio signals, e.g. by means of ultra-wide band (UWB) radio or measuring signals or correspondingly short pulsed measuring signals. The trilateration is thus based on corresponding removal measurements or distance measurements relative to at least three points, in the case of a two-dimensional position determination, or relative to at least four points, in the case of a three dimensional or spatial position determination. UWB technology is particularly suitable for the present spatially confined measuring region as vicinity radio technology.

The measuring signals for the flight time measurements are preferably emitted or received in a sequence of temporally consecutive time windows or time slots. If only very short pulses in time domain of a signal are emitted at a certain carrier frequency during the time range, a broadband spectrum emerges in the frequency domain by Fourier transformation. For UWB signals, this bandwidth lies in the region of ≥500 MHz. Presently, the very short pulses are utilized for the purpose of an exact location of objects and/or reference nodes.

Said measurements are preferably sent by said location objects, wherein an arrangement of at least three reference nodes enables a precise spatial location of objects or participants in one plane and where an arrangement of at least four reference nodes enables a precise spatial location of objects or participants in the three dimensional space. However there is thus the further problem that not all reference nodes and participants can simultaneously send or radio. This further problem can certainly be resolved by a participant management described subsequently in more detail.

Additionally, said participant management according to the invention enables a network of reference nodes related here and objects to be measured or located by means of radio to be dynamically configured during running operation.

It can be achieved by a communication technically or spatially linearly shaped linkage of reference nodes e.g. according to the inherently known "daisy chain" (DC) topology or technology, or a different, at least locally linearly shaped linkage shape, e.g. a star-shaped or circular linkage, that the communication between the reference nodes or between one administration node and the reference nodes can take place in a manner that can be controlled. Thus, at least two daisy chain (DC) topologies can also be arranged in a network segment which has the further advantage that, when a participant newly registers in the first DC topology, an already running measuring process can additionally be carried out without interruption at the same time.

A suitable DC topology can be determined or selected in such a way that an optimal communication path is possible for every participant found in the DC chain, e.g. by correspondingly minimising the respective distance between two communicating or adjacent participants. An optimal DC topology can be dynamically calculated by said administration nodes and thus can be optimally adjusted to changing conditions (e.g. by adding or removing of participants and/or reference nodes). Thus, a redundancy of the daisy chain or of the network and/or of the measuring process arises, in particular also in comparison to probable failing reference nodes, since the daisy chain or the measuring process continues to function despite such a failure.

The method according to the invention can be implemented by a suitable combination of both a time division multiple access method ("TDMA") and by means of a code division multiple access method ("CDMA"). The procedure by means of which the time windows related here are able to be dynamically produced and by means of which localization measurements are relatively easy to possibly or technically convert by communication between the (actively involved) participants of the network is of significant importance for the TDMA method. In the preferably provided two-way communication between the participants, corresponding communication packets are sent backwards and forwards (bi-directionally) between the participants and in the course of this said flight time measurements are carried out. The measuring process according to the invention thus combines the particular ability of TDMA to guarantee set measuring intervals, with a dynamic component for managing participants. Thus, an instruction for rule-based calculation of a new TDMA time slot map or plan ("TDMA Slot Map") is dynamically provided to all participants via said signal track, e.g. UWB. At the same time, the topology of the present network is communicated to new participants such that, for the most part or even completely, there is no configuration complexity In the TDMA method, there is certainly the further problem that, because of the only one physical transfer channel, a possible registration or reception of a new participant in the circle of the objects to be measured can be difficult or even impossible during a running measuring process, because of unavailable time slots. This problem is similarly solved by the method for managing participants according to the invention.

In the method according to the invention it can be provided that said two-way communication is complemented by "broadcast" communication, in which the administration node (or an administratively active reference node) preferably sends corresponding "broadcast" signals to the participants. Thus possible changes in the network can be communicated to all participants, in particular to the reference nodes, such that at least all the reference nodes have the same state of knowledge. Such changes are preferably registrations, deregistrations and re-registrations of participants or location objects. Individual time slots can be provided for said broadcast communication, so-called "broadcast slots", in comparison to so-called "ranging slots" that are provided to carry out the measuring process and the communication connected thereto.

The signals transmitted by broadcast communication preferably contain global network information for all segments or subnets found within the network, a so-called "almanac" list, along with the previously stated information about registrations, deregistrations and re-registrations. This list comprises the reference nodes present in the entire network and the respective position in the space of said reference nodes. Additionally, the list comprises information about every participant, and indeed a clear unique identifier (UID) that is independent from the respective position in the network of the participants in the network, e.g. an inherently known "MAC-ID", as well as a location identifier (LID) that is independent from the position in the network and at the same time inherently known.

The additional information can also comprise the (physical) position of a participant in the space in a coordinate system suitable for localization. In this way, a local identifier ("SID"=subnet identifier) of a network segment can be provided, wherein in a network with several segments, the combination of SID and LID provides the identifier of a participant that is necessary for the measuring operation. The communication channels generated by CDMA abd being used in a segment for registering and in the measuring operation can be clearly determined by using the SID.

In said TDMA slot map, special time slots ("forward broadcast slots) can also be provided, which is kept clear for transporting network information. The information that is transported in such a broadcast slot includes, for example, information about the coordinate system, the network topology (e.g. said almanac list). Additionally, said IDs (DID and LID) of the participants whose new registration already being accepted in the network can be communicated. Said information thus presents only examples of possible information; many different kinds of information are also able to be transferred. If there are no changes in the network, the forward broadcast is in principle not used. In order to achieve as great a redundancy as possible, during the broadcast, all the other participants (regardless of whether they are location objects or reference nodes) in the localization segment only listens to or process the information contained in the broadcast as appropriate.

A so-called "return broadcast" can also be provided, and indeed an information telegram, with which adjacent participants in a daisy chain communicate as to who has recently registered in the network or segment during the current run of the TDMA slot map.

As already mentioned, the method according to the invention enables a dynamic participant management, wherein participants to be newly registered can be received in an existing or measured participant circle or can be removed from it at any time, without the running position determination or the running position measuring process thus being inherently interrupted. It is additionally achieved by the suggested dynamic participant management that a participant that has not understood an individually communicated message e.g. because of the signal quality being too poor, is not excluded from the participant circle or is not subjected to any other disadvantages.

In said participant management it can be provided that a location object newly registering in the localization network or segment listens to the broadcast communication in the network via a first communication channel in order to receive an overview of the present reference nodes, and that the location object communicates asynchronously with a reference node selected from the broadcast communication via a second communication channel, in order to precipitate reception in the network. Thus it is possible that the broadcast communication can also take place without interruptions when a participant newly registers.

In the participant management it can be further provided that the reference node selected from the location object to be registered allocates a preliminary identifier to the location object before the administration node either accepts this preliminary identifier or, if the preliminary identifier is already allocated, retrospectively allocates a new, final identifier. Additionally, the selected reference node provides global information about the network topology to the location object to be registered, in order to facilitate or improve subsequent communication of the location object.

It should be noted that said registration of a participant in the network is to take place as quickly as possible, however must also take place as securely as possible, with minimal exchange of information. At the same time, the functional ability of the localization measuring has to be given, i.e. every mobile participant already registered must be able to autonomously determine its position in the space. In a network registration, the network topology is thus above all preferably communicated as said almanac information.

The method according to the invention and the network arrangement additionally enable a considerably simplified construction of segments in a radio network related here, in order to provide a system that is as scalable as possible. Thus both an easy scalability in terms of network size and the number of participants is to be guaranteed. Thus very large industrial areas are made readily accessible for the localization, wherein the effects of the number of participants on the repetition rate of the localization measurements related here is reduced to a possible minimum. At the same time, the effects of an indentation in size of the entire network are eliminated.

It should be additionally noted that the whole communication or corresponding signal transfer described herein can take place both synchronously and asynchronously.

The computer program according to the invention is installed to carry out every step of the process, in particular when it takes place on a computer device. For this purpose, the machine readable data storage device is provided, on which the computer program according to the invention is stored. By running the computer program according to the invention on a network related here, in particular, said administration node or a data processing device connected to it, the network arrangement according to the invention is obtained, that is installed in order to operate or control a measuring process according to the invention.

Further advantages and embodiments of the invention can be found in the description and the appended drawings.

It shall be understood that features stated above and to be subsequently explained are not only able to be used in the respective specified combination, but also in other combinations or individually without leaving the scope of the present invention.

DETAILED DESCRIPTION OF PREFERRED EMBODIMENTS

Figure 1:
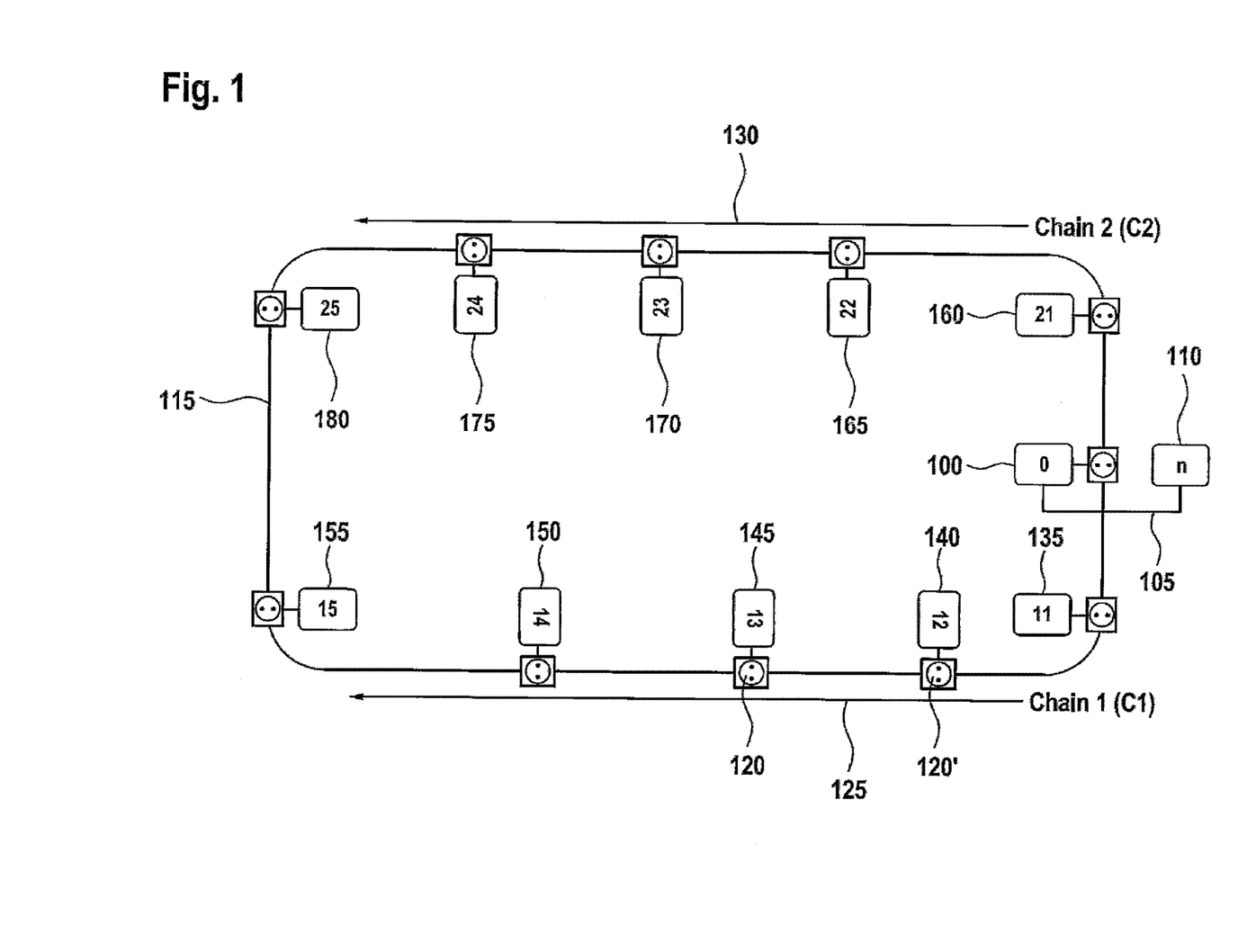
FIG. 1 shows a network formed according to the invention from two daisy chains.

FIG. 1 shows an exemplary construction of a network according to the invention formed of two daisy chains. In the communication chains based on said UWB technology in this example, communication messages are propagated sequentially between "adjacent" participants within the two "daisy chains".

The network arrangement shown in FIG. 1 comprises an administration node 100 which, in the exemplary embodiment, is connected via an Ethernet connection 105 to an external IT server 110 in an inherently known, data technical manner. This server functionality can indeed also be implemented in the administration node 100 itself. A confined space is defined by line 115, the participants being arranged or able to (dynamically) move in said space. Power supplies 120, 120' are arranged on this outer limiting line 115 in order to provide the participants with the electrical energy necessary for their operation.

In the lower half of the depiction, a first daisy chain (C1) 125 branches off from the administration node 100 and in the upper half of the depiction, a second daisy chain (C2) 130 does so. Five reference nodes 135-155 are arranged along the first daisy chain 125 in this exemplary embodiment and five reference nodes 160-180 similarly do so in the second daisy chain 130. It should be noted that still no (real) location objects are shown in this depiction.

A localization measurement of participants carried out in the network shown in FIG. 1 takes place by means of the known method of "trilateration". This method is based on individual location (in even observation) being in a circle or in a 3D space, in a spherical shell about this point, if only the distance of an object from a known point is known. In two known points, the individual location lies on the intersection points of the two spherical shells, i.e. on a circumference.

In FIGS. 2a-2d, exemplary method steps of a, first exemplary embodiment of the method according to the invention are illustrated by means of network circumstances according to the network arrangement shown in FIG. 1 in a row of successive time slots (subsequently simplified to "slots"). Shown time slots are representative slots 2, 4, 16 and 22 of the total 32 slots 400 shown in FIG. 3. Five exemplary location objects 300-320 are shown in these four depictions, by which the objects 300-315 are already registered in the network or at administration nodes and subsequently are "participants", however the object 320 is not yet registered and subsequently is still not a "participant" in the present sense. Thus the object 320 is provided with a human ear in order to indicate that it listens to a broadcast channel, as subsequently described in detail.

This first exemplary embodiment relates to the network-sided discourse of new registrations by location objects. In this exemplary embodiment for dynamically managing participants in a UWB network for localization, it is assumed that a fundamentally functional localization network that is shown in FIG. 1 exists according to the following definition: The reference nodes and the administration node are able to send out, receive and process UWB radio signals. They each have a valid LID and UID. The network comprises two daisy chains C1 and C2, each consisting of five reference nodes, wherein respectively successive participants in the chain can exchange messages mutually, i.e. bi-directionally, via the radio channel.

The number of five reference nodes per chain is only an example and can adopt any desired numerical value larger or smaller than 5, wherein the numerical value should preferably be >=3 in the two-dimensional or quasi-three dimensional localization of a locating object by means of trilateration. In a one dimensional localization or location of a locating object along a line, the numerical value has to be >=2. The two daisy chains can additionally also contain different numbers of reference nodes. However, a symmetrical construction is preferable from the point of view of resource efficiency and maximum measuring speed. The reference nodes from daisy chain C1 are subsequently shown by the numbers '11' to '15' and are contained in FIG. 1, the reference nodes from daisy chain C2 by the numbers '21' to '25'.

For the purposes of simplifying the identification of the administration node, it bears the number '0'. In the exemplary embodiment, identifying reference nodes in the UWB network or segment takes place exclusively by means of UID and LID. It is assumed that said TDMA slot map shown as an example in FIG. 3 has already been formed or is present. It should be mentioned that not only addressed participants can understand a sent message in UWB communication, but all participants that are listening to the same channel. In the communication, seven or six channels are used for communication in the present exemplary embodiment. This number is an example and can be any other desired amount. However, using n+1 or n+2 is preferred from the point of view of using the channel and of efficiency, wherein n is the maximum number of reference nodes that belong to one daisy chain. To improve the disruption security of communication, the number of channels can also be n+2 or more.

Figure 3:
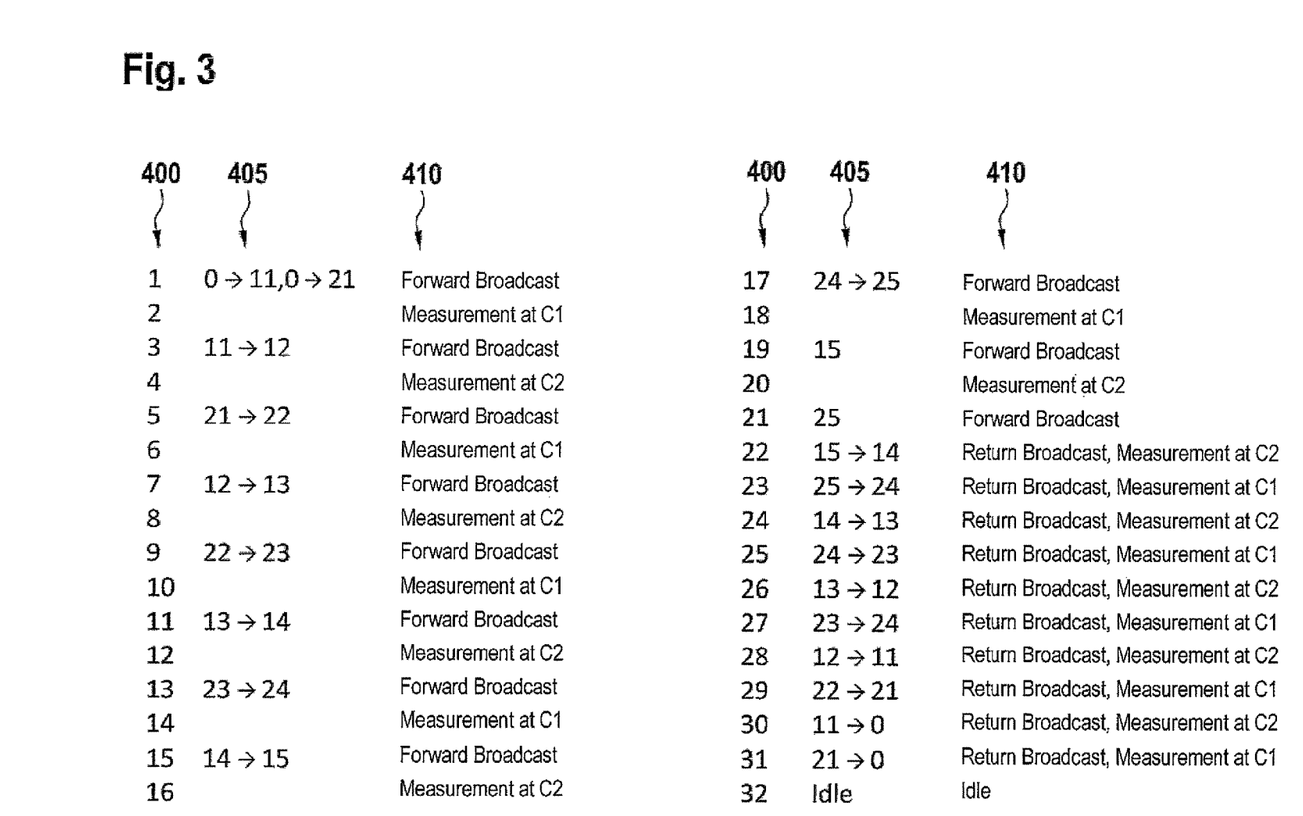
FIG. 3 shows in a table a temporal procedure of a communication protocol by means of a sequence of time slots.
Figure 4:
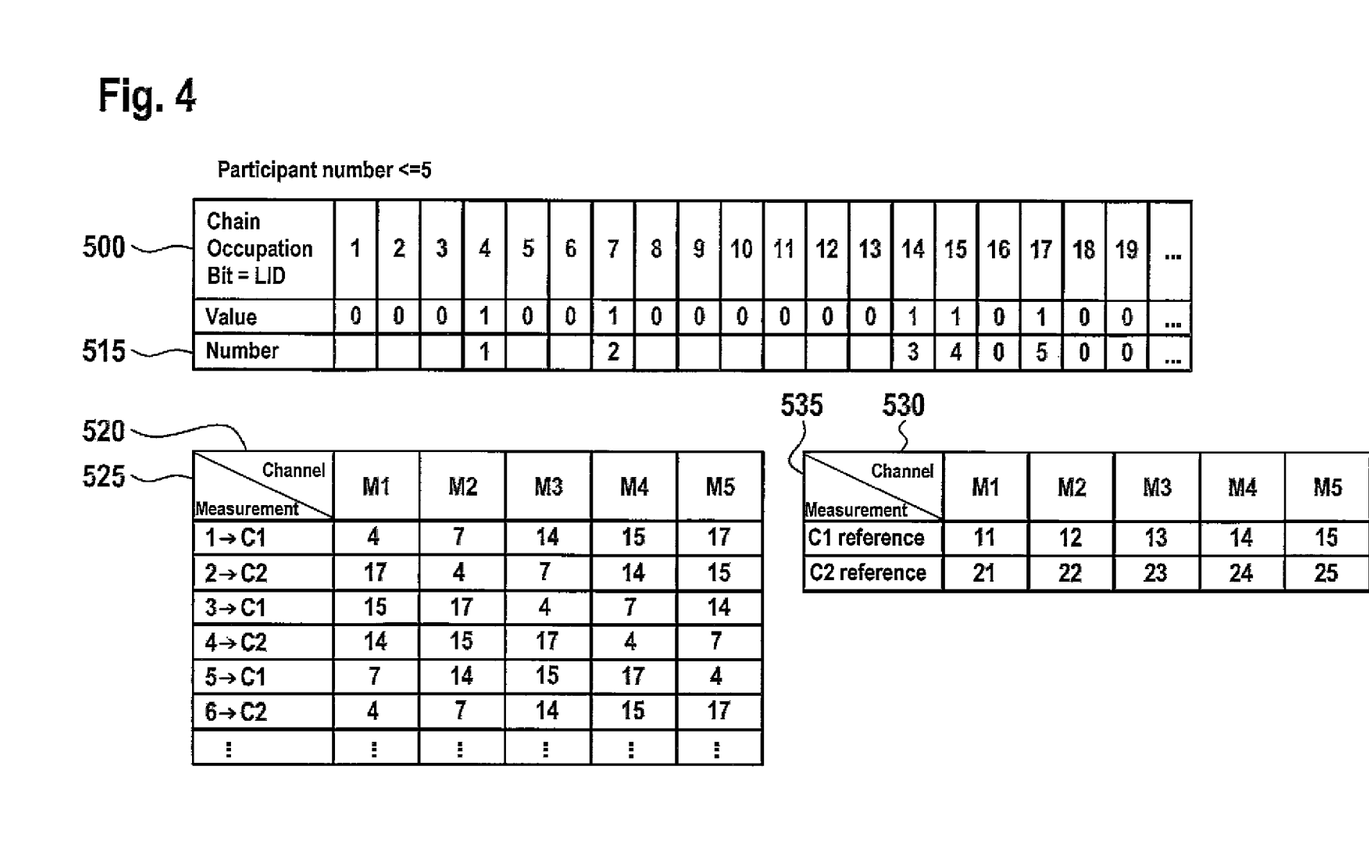
FIG. 4 shows exemplary embodiments of "chain occupation" states and communication channel states arising in the method according to the invention, and indeed in the example of a number of participants of <=5.

In this exemplary embodiment, a broadcast channel is labelled "B" and channels that are used for measuring, are labelled "M1" to "M5" according to FIGS. 3 and 4. A further channel is additionally available that is provided especially for registering new participants. This registration channel is labelled "A" and is not shown in the figures but is subsequently described in more detail. When using only six radio channels, the broadcast slot "B" is cancelled or saved and the measuring channel "M1" is used for broadcast messages.

In this exemplary embodiment, the TDMA slot map consists of 32 slots 400 and is depicted in the table shown in FIG. 3. The number of 32 slots shown in this table is only an example, such that longer or shorter lengths of the TDMA slot map are also conceivable. With shorter lengths, the number of participating reference nodes and thus the size of the localization segment is correspondingly adjusted. In the second column 405 of the table, the reference nodes interacting in the respective slot 400 in the event of a broadcast are presented by the numbering ('0', '11'-'15', '21'-'25') that is illustrated in FIG. 1 and in the third column 410 the interactions taking place between the concerned reference nodes in each of the 32 slots. Existing measuring slots are also indicated in principle.

In a first slot not shown in FIGS. 2a-2d, the administration node '0' 100 shown in FIG. 1 communicates with the reference nodes '11' 135 and '21' 160 shown in FIG. 1 on the broadcast channel B as to what has changed in the network configuration. The changes are only effective in a subsequent run of the slot map. After this comes a second slot ("slot 2") shown in FIG. 2a for determining position, in which locating objects already integrated into the measuring process are carried out on channels M1-M5 with regards to the reference nodes in daisy chain C1. Thus the usage of the channels is derived 515 from a "chain occupation" data field 500 shown in FIG. 4. In this data field, a bit is assigned to every possible LID, said bit displaying whether or not the respective LID is present in the segment at that point in time. From the number of LIDs already present, the layout of the measuring slots 525 and the measuring channels 520 M1-M5 thus to be used by the participants can be derived on the basis of a deposed rule. The respective allocation, i.e. which measuring channel 520 is allocated to which reference node, can be read in the accompanying table. The respective channel is thus specified in the first line 530 and the respective chain in the first column 535. The numbers entered in the table thus correspond to the numbers of the references in FIG. 1.

If possible, the four location objects 'o1' 300, 'o2' 305, 'o3' 310 and 'o4' 315 shown in FIGS. 2a-2d are simultaneously covered in ore single measuring time slot by means of the four reference nodes 135, 140, 145 and 150 via the communication channels 'M1' to 'M4' present here. The location object 'o5' 320 can thus be found in said listens to mode, as indicated by the symbolic ear. After this comes a "forward broadcast slot" ("slot 3") between the reference nodes '11' 135 and '12' 140. The network state shown in FIG. 2b according to slot 4 forms a measuring slot of the reference nodes 160, 165, 170, 175 arranged in daisy chain C2 with the locating objects 'o1' 300, 'o2' 305, 'o3' 310 and 'o4' 315, the channel allocation of these location objects being predetermined in turn according to the description in the "chain occupation" data field, wherein the locating object 'o5' 320 is still in said listening mode. After this comes a "forward broadcast" between reference nodes '21' 160 and '22' 165. The measuring and forward broadcast slots are always alternating, as depicted in the table in FIG. 3.

Figure 2A:
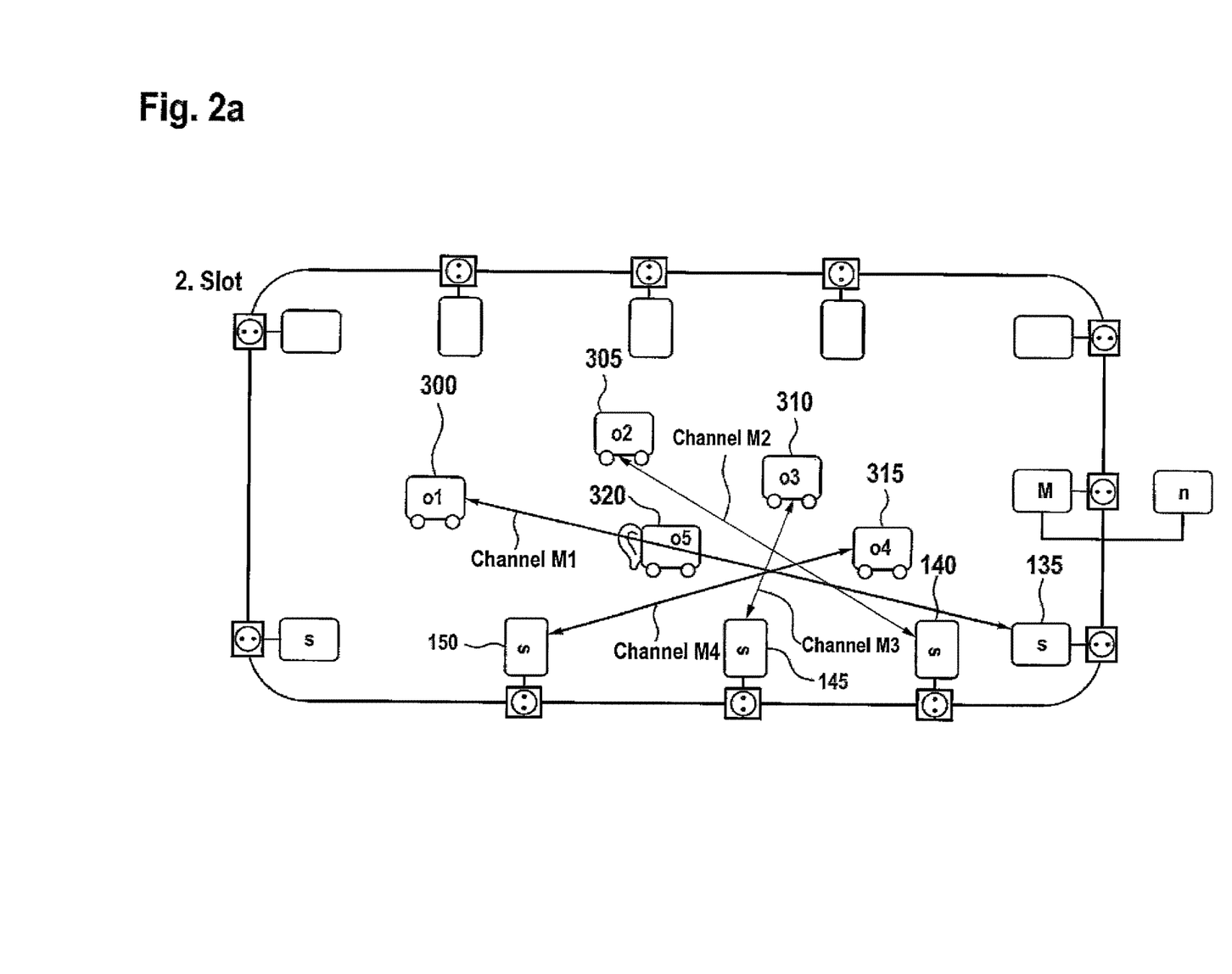
FIGS. 2a-2d show exemplary conditions when a new participant registers in a network arrangement according to the invention in different time slots.
Figure 2B:
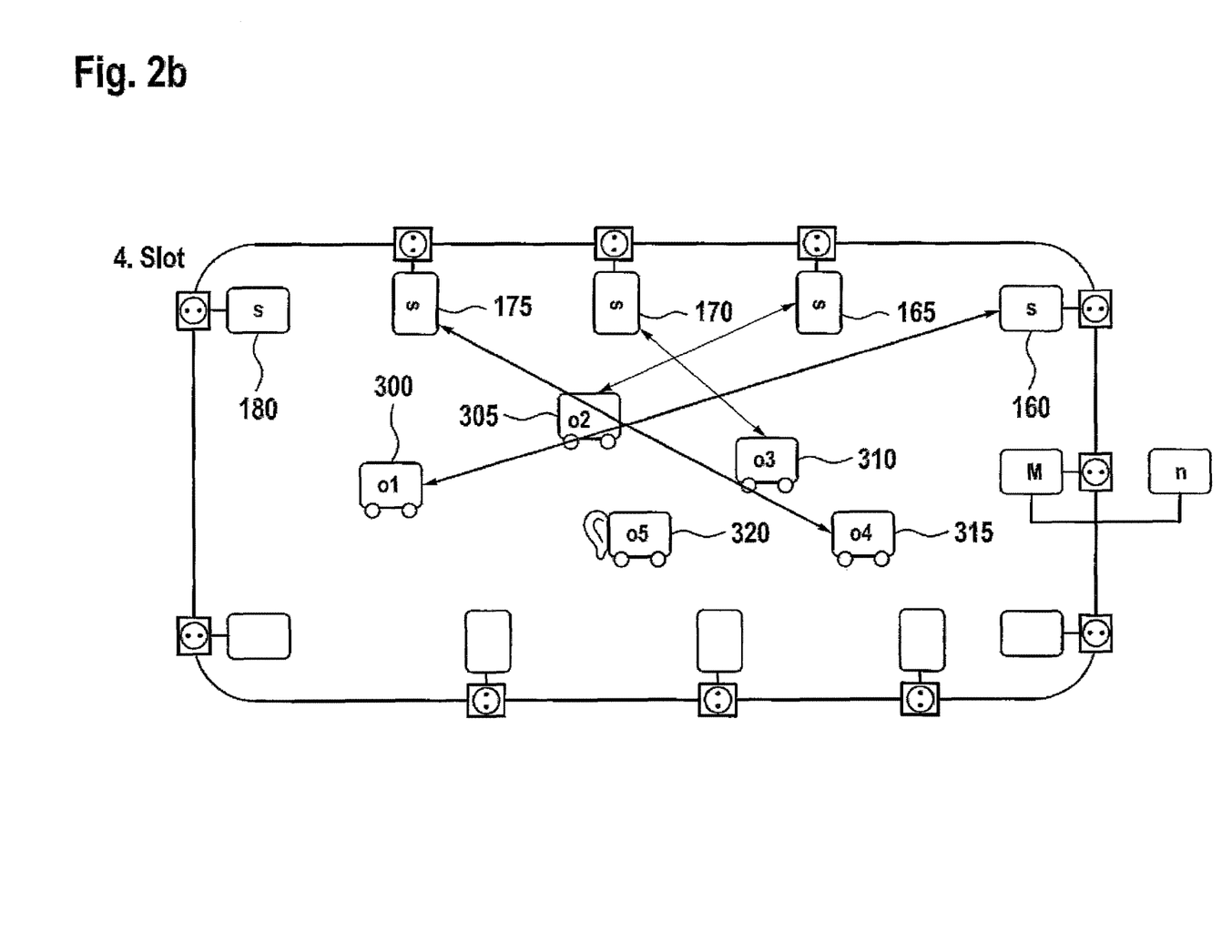
Figure 2C:
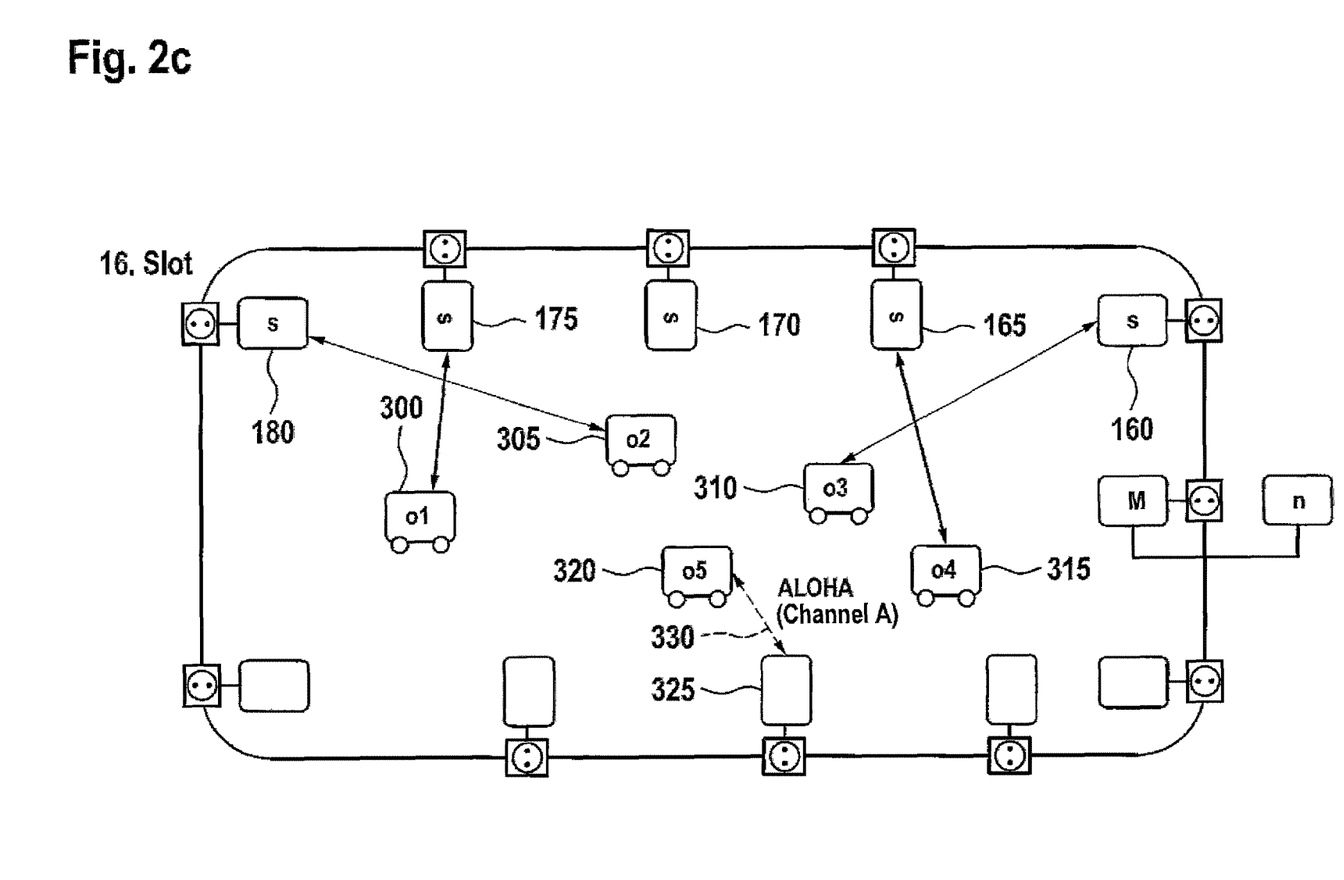
Figure 2D:
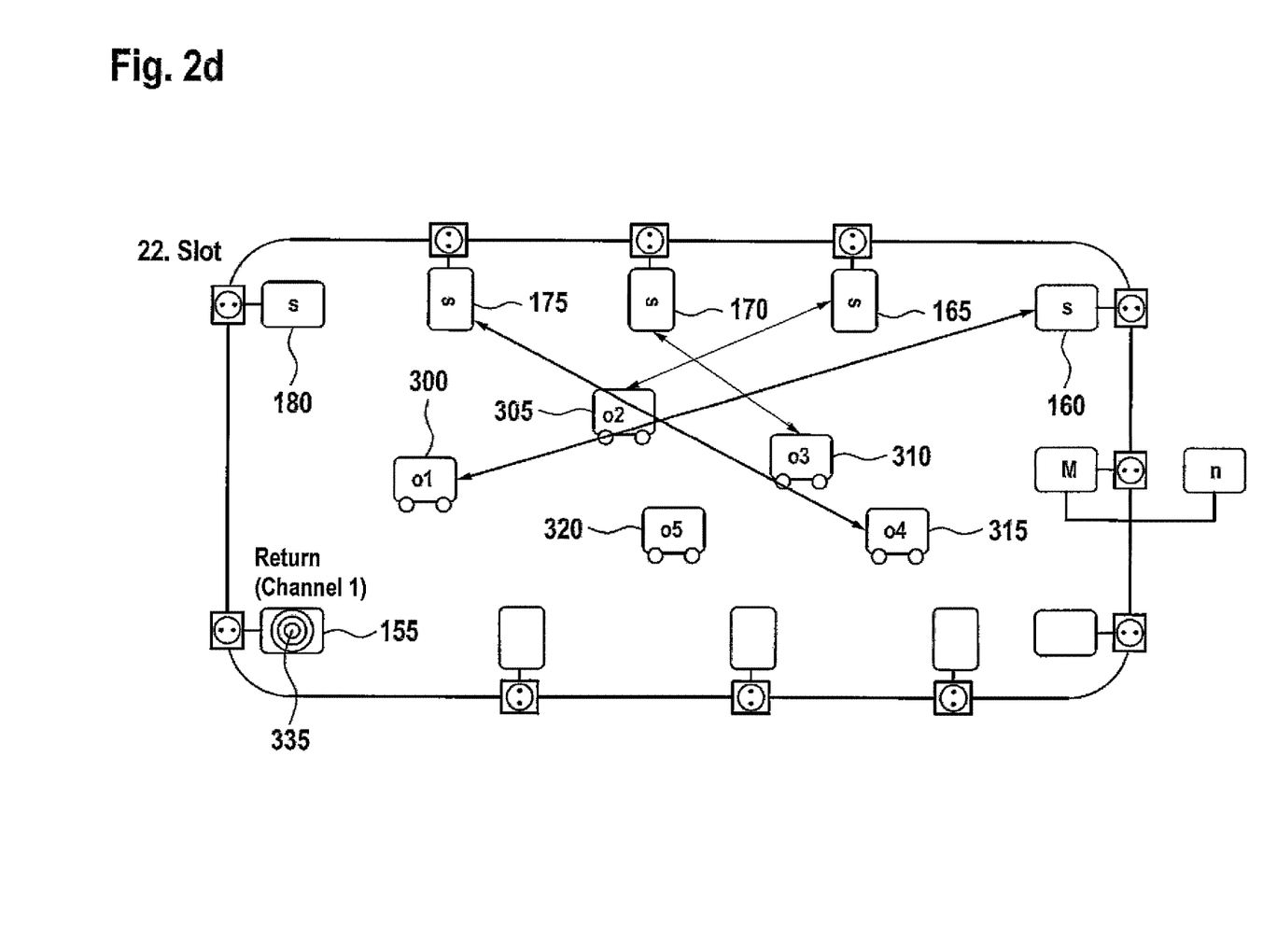

After the forward broadcast signal has reached the respective ends of the daisy chains, sending a return broadcast signal 335 shown in FIG. 2d takes place by said reference nodes '15' 155 and indeed in the present exemplary embodiment in the 22nd slot according to the slots 400 shown in FIG. 3. This return broadcast 335 plays a particular role in dynamic participant management, since here new registrations of location objects, which want to participate in the location, are communicated to the UWB network. The exact process of registering itself is subsequently described. A new participant has a preliminary LID assigned to it during the registration process according to the disclosure of its UID. Registrations in chain C1 are thus characterized by a logical '1' in the LSB of the LID in this exemplary embodiment, whereas registrations in chain C2 obtain an LID with a logical value '0' in the LSB. Thus, several applicants in each daisy chain are effectively prevented from receiving the same LID.

In the exemplary embodiment, said new registrations in the return broadcast are propagated and accumulated by their UID and assigned LID along the daisy chain from their end. Corresponding to the exemplary embodiment shown in FIG. 1, reference node 15 communicates up to a maximum of five new registrations to reference node 14 via their respective UID and LID. The reference node 14 compares these five new registrations with its list of new registrations with this reference node and checks whether one of the LIDs assigned by reference 15 has also been assigned by it and is thus doubly assigned. As long as this is not the case, the reference node 14 adds the new registration to the list of registrations allocated to it, up to a maximum of five new registrations. However, if it emerges from the check carried out by the reference node 14 that one of the LIDs assigned by it is already contained in the list of new registrations of a previous broadcast, it allocates the applicant a new LID. In the network arrangement shown in FIG. 1 with only five reference nodes per chain, the list of new registrations cannot thus exceed a length of five registrations in total each.

The described return broadcast process is uniform for every reference node along the daisy chain C1. The same method is also applied separately for the return broadcast in daisy chain C2. In the present exemplary embodiment, the daisy chains do not interact with each other during the broadcast, whereby the end point of the two return broadcast signal tracks is the administration node of the respective network or segment. With two daisy chains, a maximum number of ten new registrations per "slot map" cycle can thus take place, wherein collisions can effectively be avoided from the start. By using a longer slot map, an interaction of the two daisy chains can take place via the return broadcast, if, in the meantime, no measuring communication takes place, similar to the situation with the forward broadcast. Thus, a higher redundancy can be achieved.

After receiving the return broadcast, the administration node registers the new participant into the "chain occupation" data field and prepares a forward broadcast packet for the next "slot map" run, by the new registrations that have taken place in the meantime being communicated to the receiving reference nodes or participants.

The described process duration presents a possible implementation of the process of managing participants. Other manifestations of the method are also possible.

In this way, in an extension of the procedure, diagnosis information about the registered participants and reference nodes can additionally be accumulated and communicated in the return broadcast, in order to simultaneously obtain a dynamic entire overview of the network and to prevent it coming to failures or interruptions. The administration node can communicate this diagnosis information, in particular also the information about new registrations to a central server 110 via an input 105 shown in FIG. 1 to an IT network, in order to enable a depiction in control consoles or IT management systems. The network management is however also possibly detached from the existence of an existing IT network. The connection to an IT network can take place via an accessible Ethernet connection or pertinently known wireless connections.

According to the preceding description of the network-side processing of a new participant registering (i.e. substantially by the reference nodes) on a UWB network related here for localization, an exemplary embodiment of the process course for registering a locating object is subsequently described.

In this exemplary embodiment, the described, special arrangement of the TDMA process and the described channel structure are particularly advantageous. The "TDMA slot map" is arranged here in such a way that localization measurements only ever take place in the channels M1-M5 shown in FIGS. 3 and 4 to a part of the reference nodes or even only via one of the two daisy chains C1 or C2 shown in FIG. 1. During the course of these localization measurements, the remaining reference nodes can wait on communication channel A for new registrations. During the forward broadcast, no messages about possible (new) registrations by participants can be exchanged.

In the present return broadcast signal, a special method can be applied, in which e.g. only ever one of two direct successors in the daisy chain is unable to receive any registration messages. This can additionally be dynamically adapted via the network diagnosis in order to dynamically compensate failures by reference nodes. In this way, even a new registration of a participant can thus take place, despite a regularly running localization measuring operation and return broadcasts.

If a location object should be newly received or registered in the localization network or a network segment, for example the location object 'o5' 320 shown in FIG. 2c, in this way it contacts any reference node of the localization network or segment, by using an inherently known "ALOHA" protocol, in which a "listen-before-talk" method with stochastic telegram communication is provided, e.g. in the 16$^{th}$ slot shown in FIG. 2c (according to FIG. 3) the reference nodes 325 via the communication channel 'channel A' 330 shown here.

Figure 5A:
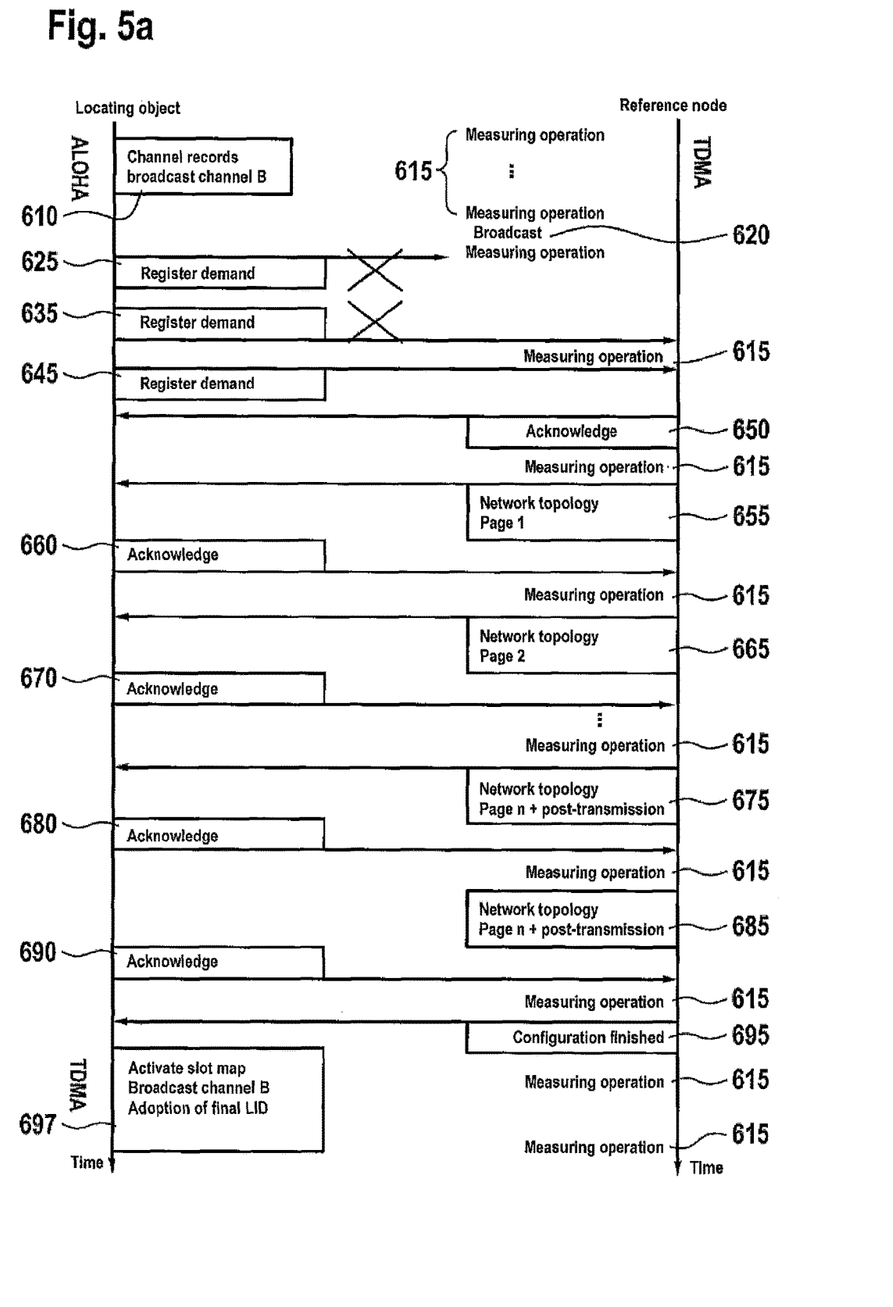
FIGS. 5a, b show two exemplary embodiments of communication events taking place in a network arrangement according to the invention.

The course of the registration process is depicted in detail in FIG. 5a. The schematic timeline going from top to bottom for the locating object is depicted, including the running measuring 615 and broadcast communication. The locating object uses both the TDMA-protocol or method and the ALOHA-protocol as depicted in FIG. 5. Before contact is made, the newly signed in location object initially listens to the communication on the network on channel B 610 for a short time, in order to receive a first overview via the broadcast information 620 as to which reference nodes are present in the network or segment for localization and to which reference nodes the communication can allegedly be most reliably constructed because of the greatest signal strength. The actual registration process then happens via making contact 625 with a correspondingly selected reference node via communication channel A. If the reference node contacted in such a way is occupied at this point in time because of other UWB communication, the data packet is not initially heard. Therefore, under certain circumstances, the locating object requires several attempts 635 and 645 to establish a successful communication.

If the communication cannot thus be established for a long time, the locating object contacts a different reference node. The registration packet thus consists of a request command to be received on the network, the UID of the node and some further information about the locating object. In particular, it is thus also communicated which configuration state, if present, from its most recent participation in the location communication as to the locating object is in.

Every registration attempt is initially confirmed by the respectively contacted reference node with information 650 which specifies whether the registering participant may or may not register at all. In this way, a participant can be rejected if an empirically predetermined, maximally permissible participant number in the network segment has been reached, if the applicant has been identified as a reference node because of its UID or if the network is in an operation state that is not suitable for localization. The thus respectively contacted reference node has a complete overview of the topology of the network at any time because of the broadcast information running in the segment, said information forming the scope of the UWB communication. In this way, the reference node can decide, by means of the transmitted information of the participant, what information the participant needs to receive in the UWB network, to be able to carry out the registration process in a resource-efficient manner. The information that is thus provided to the applicant in the subsequent communication thus comprises said "almanac" list. Additionally, the applicant receives a preliminary LID and relevant information about the selected coordinate system (coordinate transformation, rotation) as a communication.

In this exemplary embodiment, the communication of said broadcast information takes place in the form of several telegram pages, exemplarily depicted via the packets 655, 665, 675 and 685, which are each able to be identified via their page number and the UID of the addressed applicant (or of the registering participant) in connection with a data acquisition command. A telegram page can, in the chosen example, thus contain 124 bytes of information, in order to complete the respective communication process before a next slot in the slot map begins. The applicant confirms 660, 670, 680 and 690 the received information by stating its UID and the receiving side. The correspondingly suitable page size thus depends on the chosen length of the TDMA slots and, in the chosen manifestation of the hardware used, can reach up to 1000 bytes. However, any other page lengths are also conceivable. Typically, the amount of information to be transferred is around 20 to 30 page, in some cases more. The participant now registered generates an individual slot map after completing 695 the registration communication, and indeed by omitting the own measuring slots, and then initially listens to the broadcast channel B of its network segment 697, in order to directly hear possible subsequent further network changes. In the "return broadcast" (not shown here) of the current communication in the present segment or, if a new slot map course has already started, in the forward broadcast, the newly registered participant can monitor the disclosure of its re-registration (or registration in the new segment).

In order to prevent possible collisions with other registration processes in the described communication of the network topology, said processes being able to run in parallel on further reference nodes of the same daisy chain, a demand can additionally be made by the applicant before sending data.

Subsequently, a second exemplary embodiment or usage scenario shown in FIG. 5b of the method according to the invention is described, and indeed as an example of a dynamic re-registration of a participant from presently a first (network) segment into a second segment. This method is based on said dynamic participant management in a UWB network related here for localization of objects, which remains extensively unchanged for registering participants and for constructing said "slot maps", certainly up to the subsequently described points.

In this usage scenario, the previously described process course can be correspondingly used in every segment of the network. The channels for measuring M1-M5 described by means of FIGS. 3 and 4, as well as the broadcast channel B according to FIG. 3 and the registration channel A not shown in the figures, present a local channel labelling in this scenario and thus have to be shown in effective, physical channels. These are thus correspondingly identified via the labelling already known of the individual channels (A, B, M1-M5), to which, additionally, an identification of a channel bundle not shown in the figures can be placed in front. In this way, in a channel bundle, for example the channels 5.A, 5.B and 5.M1-5.M5 would arise.

Figure 6:
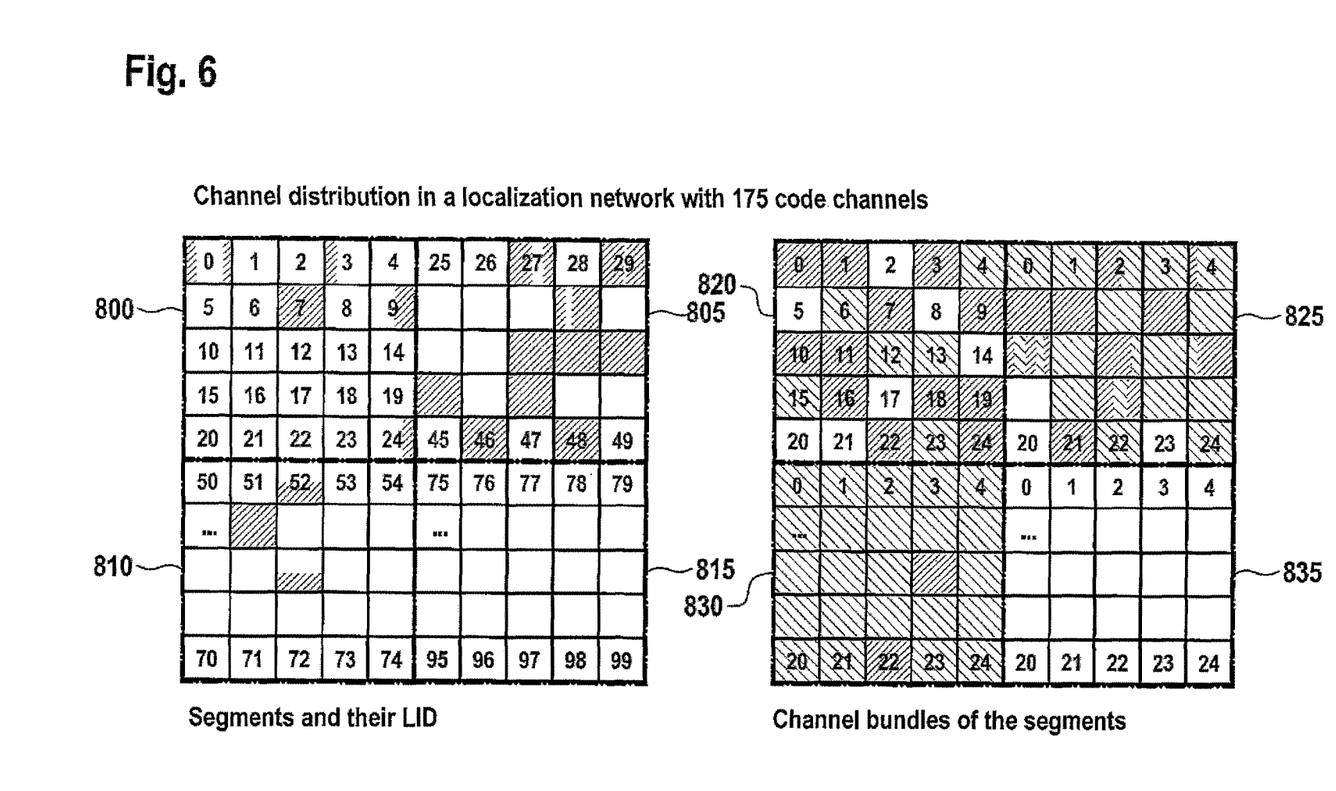
FIG. 6 shows an exemplary channel bundle distribution for preventing crosstalk between localization segments.

In order to prevent crosstalk of (UWB) communication channels between the different segments depicted in FIG. 6 by the exemplarily allocated numbers '0'-'99' of the localization network, it is advantageous to produce a total number of 256 channel bundles or 1792 channels correspondingly. Since such a number of orthogonal, i.e. channels that are not crosstalking, cannot be chosen at random, an approach that is able to be implemented with considerably lower complexity is shown in FIG. 6.

In the location network schematically depicted on the right side of FIG. 6 with 99 segments for example, the channel bundle is calculated as an integral remainder of a division of the SID by any number of channel bundles able to be predetermined a priori, and indeed 25 channel bundles in the present exemplary embodiment. Thus it is an advantage, as in the exemplary embodiment depicted in FIG. 6, to use a square number of an integral number of SIDs for the channel bundle. This square number is thus determined from the edge length of the given tiles 800, 805, 810 and 815 (5 by 5 in the present example). The chosen allocation sequence of SIDs in the depicted examples is thus chosen in a regular pattern, which presents a suitable implementation in an isotropic space. The areas emerging from this with repeating channel bundles correspond to the surfaces 820, 825, 830 and 835. In this way, a maximum interruption distance between equal channel bundles is achieved on the respective surfaces 820, 825, 830 and 835. Depending on the real usage scenario, any of the patterns adjusted to the respective usage case for allocating the SID can be chosen in order to further improve security against crosstalk. The depicted implementation thus forms only one possible manifestation of the described method.

In the present usage scenario, the method already described above for communication, producing a TDMA slot map, for communication along the daisy chain and the existing nodes can be correspondingly used in a functional segment. Addressing or identifying participants in a segment further takes place only via their LID. Alternatively, identifying the participants can also take place via a combination of LID and SID in the segment-internal communication. The SID in the present exemplary embodiment has a length of 1 Byte in order to guarantee the most efficient communication at simultaneously high numbers of participants. Thus 256 subnets (or segments) are conceivable in one localization network. Said parameters form only one exemplary information set and further information about the complete description of the network topology may be necessary.

However, the described method for a participant (newly) registering is presently complemented by a block which represents the search for the network segment. Said broadcast channel B is always clearly able to be identified via the above depicted manner of channel bundling. It is unknown to a location object itself as to which SID the next available segment of the localization network has. If a location object is newly registered, the location object initially identifies the next available network segment. This happens in turn by listening to a broadcast channel, by which status updates communicated in the segment are sent. The location object now changes in a coincidental or deterministic manner, by all or one part of the possible channel bundle in the respective broadcast channel. This process can take place until a signal is incidentally detected on a broadcast channel. A more reliable manifestation of the invention partially or completely changes as a result of the remaining broadcast channels and tries to record a status update of a different network segment. The process duration already described for registering is then carried out subsequently in one network segment, for which the best available signal to noise ratio has been achieved.

Apart from the allocation of an LID given in the above description, when registering, the reference node in which the registration process is taking place additionally communicates the SID of the network segment, in which the location object is currently trying to register, to the location object.

By creating different network segments in which the communication takes place in independent code channels, a size technical scale of location networks can be achieved. This scalability allows for both the distribution of location objects across the different segments and the bundling of measurements on reference nodes available in one segment without dramatic influence on the surfaces—and thus of the number of necessary reference nodes—and of the participant number at the measuring interval.

The segmenting of a localization network certainly requires the creation of the possibility of participants re-registering between different network or radio segments, in order to guarantee free movement of location objects across the entire location network. This transfer of location objects between network segments is described below.

To support such a re-registration process, the result of the location of an object can thus be used, and indeed together with the information that the location object has obtained during its initial registration in a segment or via broadcast messages in the measuring duration. Thus, the location object can decide, based on its position (and e.g. additionally based on its movement direction) and the present almanac data, when it has reached a segment in the location network that is better suited to location. One criterion for the suitability of a location segment can for example be the proximity to the reference nodes, the exactness of the location results that is theoretically able to be achieved, the signal strength of the received communication or a combination of such criteria. Other criteria, which are based on a map of the space in which the location object moves, or are met by adaptive/neuronal algorithms, are thus able to be used. If the locating object decides to change into a different segment, then both the SID of the target segment and the positions of the reference nodes of this segment are known to it from the almanac list.

Figure 5B:
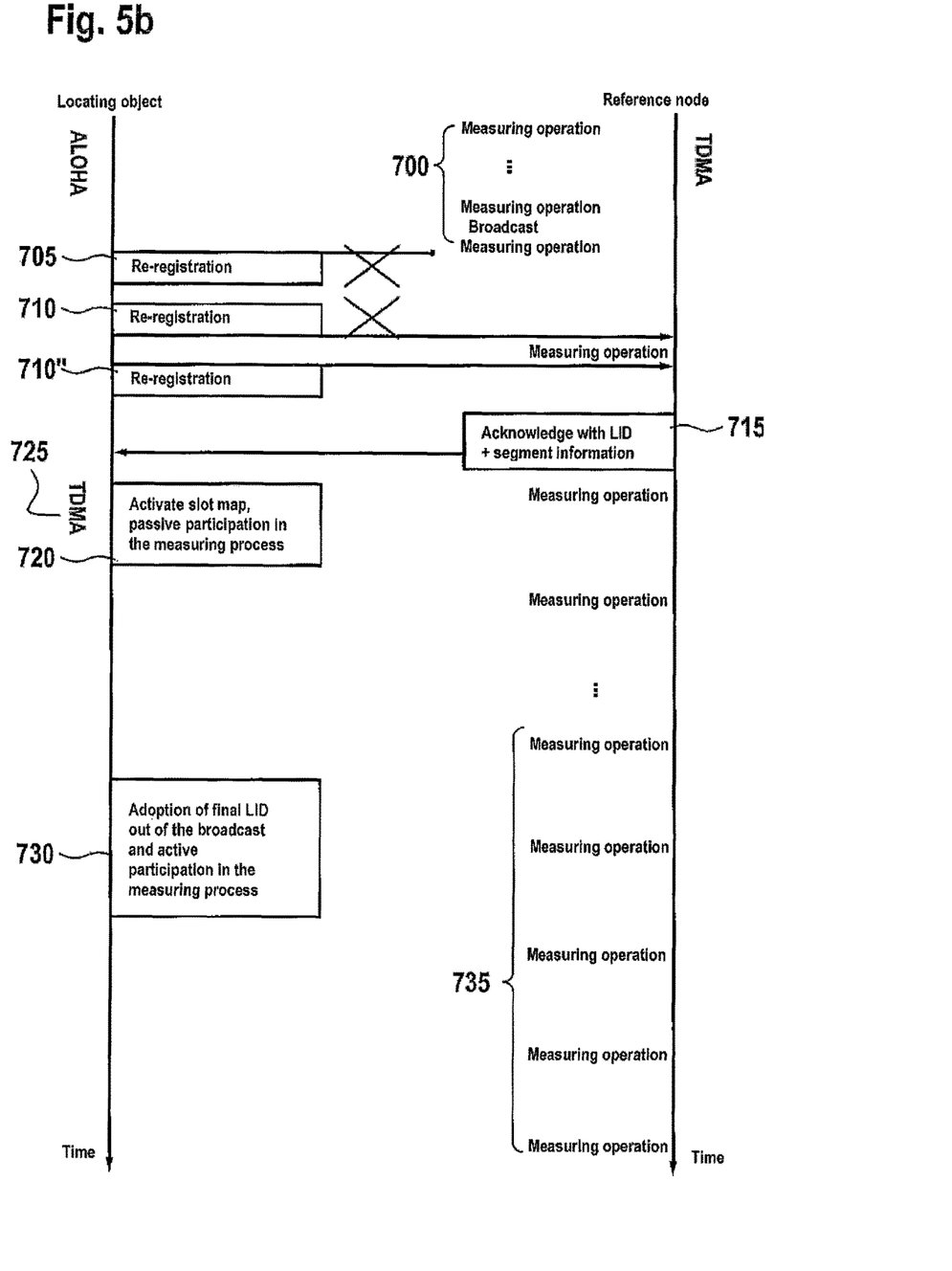

The exact process course of this communication is exemplarily depicted in FIG. 5b. During the measuring operation or broadcast 700 by the respective reference node, a re-registering participant initially contacts a nearest target reference node of the respective target segment on said registration channel A. In the example it is assumed that the first two contactings 710, 710' are not successful, but the third contacting 710" is. In order to thus not prevent registrations of different participants running in parallel, the communication takes place by using a listening already mentioned of the broadcast 700 with simultaneous usage of a stochastic choice of the communication time period (said ALOHA method). The re-registering participant communicates its intention to change localization segment to the chosen target reference node by making contact. At the same time, the re-registering participant communicates its UID, the versions of its firmware, the almanac list used and other parts of the network information already described to the target reference node. The reference node contacted in such a way confirms 715 this request by accepting or declining the network segment change.

If the version of the almanac list, the coordinate transformation or the logical spaces have to be changed in the current broadcast, the re-registering participant receives this change communicated by the reference node. Furthermore, the re-registering participant receives a new preliminary LID and information about the allocation of reference nodes of the segment with regards to the respective daisy chains and their sequence within their respective daisy chain. In total, there is thus a very small amount of information that can be transferred in a data page. In this way, the re-registering participant can immediately generate 720 a preliminary slot map and, on receiving its acceptance in the segment, can immediately change 725 to the TDMA mode.

The participant re-registered in such a way initially further listens to the broadcast channel B of its new network segment 730 in order to directly listen to any network changes, however omits its provided time slots for the subsequent TDMA measuring operation 735. In the return broadcast (not shown here) of the current communication in the present segment or, if a new slot map process has already started, in the forward broadcast, the re-registered participant can recognize the disclosure of its re-registration (or registration in the new segment) and from then on participate in the next slot map run in the regular measuring operation. Before re-registering in the new network segment, a deregistration can additionally take place in the previous network segment in order to achieve as efficient a communication as possible between the participants found there, even in the previous network segment.

What is claimed is:
1. An apparatus comprising:
   locating objects that are arranged in a confined space and are able to be moved, each locating objects emitting pulsed radio signals, and at least three reference nodes that are operating communication-technically autarkic, spatially distributed and form a communication network segment arranged in the confined space, wherein the at least three reference nodes are arranged or formed to be communication-technically linked, wherein the at least three reference nodes and the locating objects are managed with communication technology, wherein at least one locating object is able to be located by a distance-based trilateration that is carried out by the at least three reference nodes, wherein a locating object newly registering in the communication network segment listens to a broadcast communication in the communication network segment via a first communication channel in order to receive an overview of the at least three reference nodes present in the communication network segment, and the locating object communicates asynchronously with a reference node of the at least three reference nodes selected from the broadcast communication via a second communication channel, in order to cause the reception of the locating object in the communication network segment, and wherein the selected reference node allocates a preliminary code to the locating object and provides global information about the network topology.

2. The apparatus according to claim 1, wherein the confined space is divided into at least two network segments, between which re-registrations of participants or locating objects are possible.

3. The apparatus according to claim 1, wherein a locating object arranged in the confined space is communication-technically assigned to one of the at least three reference nodes at a given point in time.

4. The apparatus according to claim 1, wherein, in addition to the at least three reference nodes, an administration node is arranged in the confined space, by means of which the at least three reference nodes and the arranged locating objects as appropriate, are managed with communication technology.

5. The apparatus according to claim 1, wherein "broadcast" signals are sent to participants of the communication network segment, by means of which signals changes in the communication network segment are communicated.

6. The apparatus according to claim 5, wherein changes in the communication network segment are registrations, deregistrations and re-registrations of participants.

7. The apparatus according to claim 5, wherein the broadcast signals contain information about a global network topology and/or comprise the reference nodes present in the communication network segment and/or a clear identification code that is independent of the respective position of a participant in the communication network segment and/or a local code that is independent of the position of a participant in the communication network segment and/or further global network information.

8. The apparatus according to claim 7, wherein the global network information comprises the position of a participant in the confined space in a coordinate system suitable for localization.

9. The apparatus according to claim 1, wherein the at least three reference nodes are arranged or formed to be communication technically linked to be linear, star-shaped or circular.

10. The apparatus according to claim 9, wherein at least two linear chains of reference nodes are arranged in the confined space.

11. The apparatus according to claim 1, comprising dynamic participant management, in which time slot plans and/or topology information about the communication network is dynamically provided to the participants.

12. A method for operating an apparatus according to claim 1 to locate at least one locating object by "trilateration" by pulsed radio signals, wherein the at least one locating object is managed by a dynamic participant management, wherein time slot plans and/or topology information about the communication network is dynamically provided.

13. The method according to claim 12, wherein a dynamic time slot allocation is carried out by a suitable combination of both a time division multiple access method (TDMA) and by means of a code division multiple access method (CDMA).

14. The method according to claim 12, wherein global information about the global network topology is sent to the participant by means of a "broadcast" communication.

15. The method according to claim 14, wherein the signals transmitted by means of broadcast communication additionally comprise information about registrations, deregistrations and/or re-registrations.

16. The method according to claim 14, wherein the broadcast communication comprises an error-redundant forward broadcast of global information and of identification information of active participants.

17. The method according to claim 14, wherein registrations, deregistrations and/or re-registrations of participants are communicated to the administration nodes by means of a return broadcast.

18. The method according to claim 17, wherein the combination of forward broadcast and return broadcast ensures that a participant not uniquely reached by the forward broadcast is not excluded from participating in the communication and does not interrupt the communication with other participants.

19. A machine readable data storage device, on which a computer program is stored that is configured to carry out each step of a method according to claim 12.

* * * * *